(12) United States Patent
Yoon (10) Patent No.: US 9,386,495 B2
(45) Date of Patent: Jul. 5, 2016

(54) APPARATUS AND METHOD FOR SUPPORTING PERSONAL NETWORKING IN MOBILE COMMUNICATION SYSTEM

(71) Applicant: Samsung Electronics Co., Ltd., Gyeonggi-do (KR)

(72) Inventor: Seung-Il Yoon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 119 days.

(21) Appl. No.: 14/106,032

(22) Filed: Dec. 13, 2013

(65) Prior Publication Data

US 2014/0171079 A1 Jun. 19, 2014

(30) Foreign Application Priority Data

Dec. 13, 2012 (KR) .................. 10-2012-0145116

(51) Int. Cl.
*H04W 36/00* (2009.01)
*H04W 36/22* (2009.01)
*H04W 36/14* (2009.01)

(52) U.S. Cl.
CPC .............. *H04W 36/22* (2013.01); *H04W 36/14* (2013.01)

(58) Field of Classification Search
CPC .. H04L 12/5692; H04W 36/14; H04W 88/06; H04W 28/18; H04W 36/26
See application file for complete search history.

(56) References Cited

U.S. PATENT DOCUMENTS

| | | | | |
|---|---|---|---|---|
| 6,085,086 A | * | 7/2000 | La Porta | G06F 9/4856 455/432.3 |
| 7,400,600 B2 | * | 7/2008 | Mullany | H04L 12/5692 370/329 |
| 2012/0030343 A1 | | 2/2012 | Ryder | |
| 2014/0003404 A1 | * | 1/2014 | Gillett | H04W 48/18 370/338 |

* cited by examiner

*Primary Examiner* — William Nealon
(74) *Attorney, Agent, or Firm* — The Farrell Law Firm, P.C.

(57) ABSTRACT

Methods and apparatus are provided for supporting personal networking by a personal server in a mobile communication system. A request is received from a mobile station. A current position of the mobile station and a required QoS are registered in response to a request of the mobile station. When a handover is made from a resource management system of a service provider B to a resource management system of a service provider A, movement of a user agent to the resource management system of the service provider A is requested based on the current position of the mobile station and the required QoS. When the movement of the user agent is completed, a user information update request is received for updating a result of a QoS negotiation by the required QoS, and information on a selected access network, from the resource management system of the service provider A.

16 Claims, 5 Drawing Sheets

APPARATUS AND METHOD FOR SUPPORTING PERSONAL NETWORKING IN MOBILE COMMUNICATION SYSTEM

PRIORITY

This application claims priority under 35 U.S.C. §119(a) to Korean Application Serial No. 10-2012-0145116, which was filed in the Korean Intellectual Property Office on Dec. 13, 2012, the entire content of which is incorporated herein by reference.

BACKGROUND OF THE INVENTION

1. Field of the Invention

The present disclosure relates to a method and an apparatus for supporting personal networking in a mobile communication system.

2. Description of the Related Art

In a pervasive or ubiquitous computing and/or cloud computing environment corresponding to personal networking, provision of seamless accessibility of computing objects, such as, for example, contents or applications, has been researched regardless of the type of wireless/wired access network that a mobile station accesses.

An action of a user accessing preferred access networks (for example, licensed band or unlicensed band) is different from actions of other users accessing preferred wireless networks at the same position. The actions of the users may vary depending on various factors, such as, for example, whether the users have an unlimited data plan, preferred networks based on a previous experience, and types of devices that the users currently use.

Particularly, most users have mobile stations supporting a plurality of different interfaces, and such devices include a combination of wireless interfaces that are very different from each other. Further, service providers operate a plurality of different wireless access networks and have a function of managing distribution to a plurality of networks wirelessly connected with the joined user.

In order to maximize seamless connectivity and increase efficiency of load distribution over overlaid wireless networks, a particular access technology or a new structure that is not dependent on Quality of Service (QoS) management methods is required.

Further, various requirements from users having different types of portable devices are required to be adopted through the aid of heterogeneous wireless/wired access networks in terms of coordination.

Conventional approaches assume that personal resource management is fixed, but service operators may be unable to achieve load distribution over overlaid wireless networks.

SUMMARY OF THE INVENTION

The present invention has been made to address at least the above problems and/or disadvantages and to provide at least the advantages described below. Accordingly, an aspect of the present invention provides an apparatus and a method in which service operators distribute loads over overlaid wireless networks.

Another aspect of the present invention provides an apparatus and a method for efficiently transmitting user data.

An additional aspect of the present invention provides an apparatus and a method for selecting an access network according to requested QoS.

In accordance with an aspect of the present invention, a method is provided for supporting personal networking by a personal server in a mobile communication system. A request is received from a mobile station. A current position of the mobile station and a required QoS are registered in response to a request of the mobile station. When a handover is made from a resource management system of a service provider B to a resource management system of a service provider A, movement of a user agent to the resource management system of the service provider A is requested based on the current position of the mobile station and the required QoS. When the movement of the user agent is completed, a user information update request is received for updating a result of a QoS negotiation by the required QoS, and information on a selected access network, from the resource management system of the service provider A.

In accordance with another aspect of the present invention, a method is provided for supporting personal networking by a resource management system of a service provider A. When a handover is made from a resource management system of a service provider B to the resource management system of the service provider A, a request for a movement of a user agent based on a current position of a mobile station and a required QoS, is received from a personal server. A QoS negotiation is performed between the user agent and a resource manager by the required QoS. When the QoS negotiation has succeeded, an access network that the mobile station will access is selected. An update of user information to update a result of the QoS negotiation by the required QoS and information on the selected access network, are requested.

In accordance with another aspect of the present invention, an apparatus is provided for supporting personal networking in a personal server in a mobile communication system. The apparatus includes a storage unit that registers a current position of a mobile station and a required QoS in response to a request of the mobile station. The apparatus also includes a controller that, when a handover is made from a resource management system of a service provider B to a resource management system of a service provider A, requests movement of a user agent to the resource management system of the service provider A based on the current position of the mobile station and the required QoS. The apparatus additionally includes a receiver that receives a request from the mobile station and, when the movement of the user agent is completed, receives a user information update request for updating a result of a QoS negotiation by the required QoS, and information on a selected access network, from the resource management system of the service provider A.

In accordance with another aspect of the present invention, an apparatus is provided for supporting personal networking in a resource management system of a service provider A. The apparatus includes a receiver that, when a handover is made from a resource management system of a service provider B to the resource management system of the service provider A is made, receives a request for a movement of a user agent from a personal server based on a current position of a mobile station and a required QoS. The apparatus also includes a resource handler that, when a QoS negotiation between the user agent and a resource manager is made by the required QoS and the QoS negotiation has succeeded, selects an access network that the mobile station will access. The apparatus additionally includes a sub module that requests an update of user information to update a result of the QoS negotiation by the required QoS and information on the selected access network.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Although the names defined in the communication standard to which a mobile cloud computer environment is applied are equally used in the following detailed description of the present invention to solve the above described technical problem, the standard and names do not limit the scope of the present invention, and the present invention can be applied to a system having a similar technical background.

Hereinafter an agent and a user agent will be used interchangeably.

Figure 1:
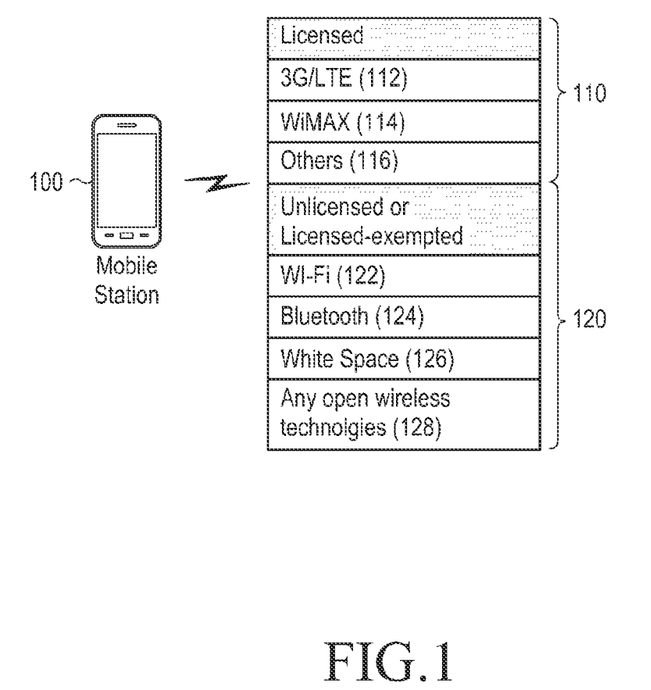
FIG. 1 is a diagram illustrating a structure of an interface connected with a mobile station.

FIG. 1 illustrates a structure of an interface connected with a mobile station.

As illustrated in FIG. 1, a mobile station 100 supporting multi-access may access a plurality of licensed interfaces 110 or unlicensed interfaces 120.

The licensed interfaces 110 include, for example, a 3 Generation (3G)/Long Term Evolution (LTE) interface 112, a World Interoperability for Microwave Access (WiMAX) interface 114, and other interfaces 116.

The unlicensed interfaces 120 include, for example, a Wi-Fi interface 122, a Bluetooth interface 124, a White Space interface 126, and an interface 128 supporting any open wireless technologies.

Having a plurality of licensed or unlicensed wireless interfaces means that service operators can also provide a plurality of different licensed and unlicensed wireless networks. The service operators can provide unlicensed wireless networks as supplementary networks of licensed wireless networks. By distributing some data services requiring the transfer of large amounts of traffic to the unlicensed networks, traffic loads in the licensed networks can be reduced.

Since many mobile users may have a plurality of mobile stations and a mobile station having a plurality of different wireless interfaces accesses a plurality of overlaid wireless networks, the mobile users may access networks of a plurality of service providers described below through FIG. 2 rather than networks of one service provider.

Figure 2:
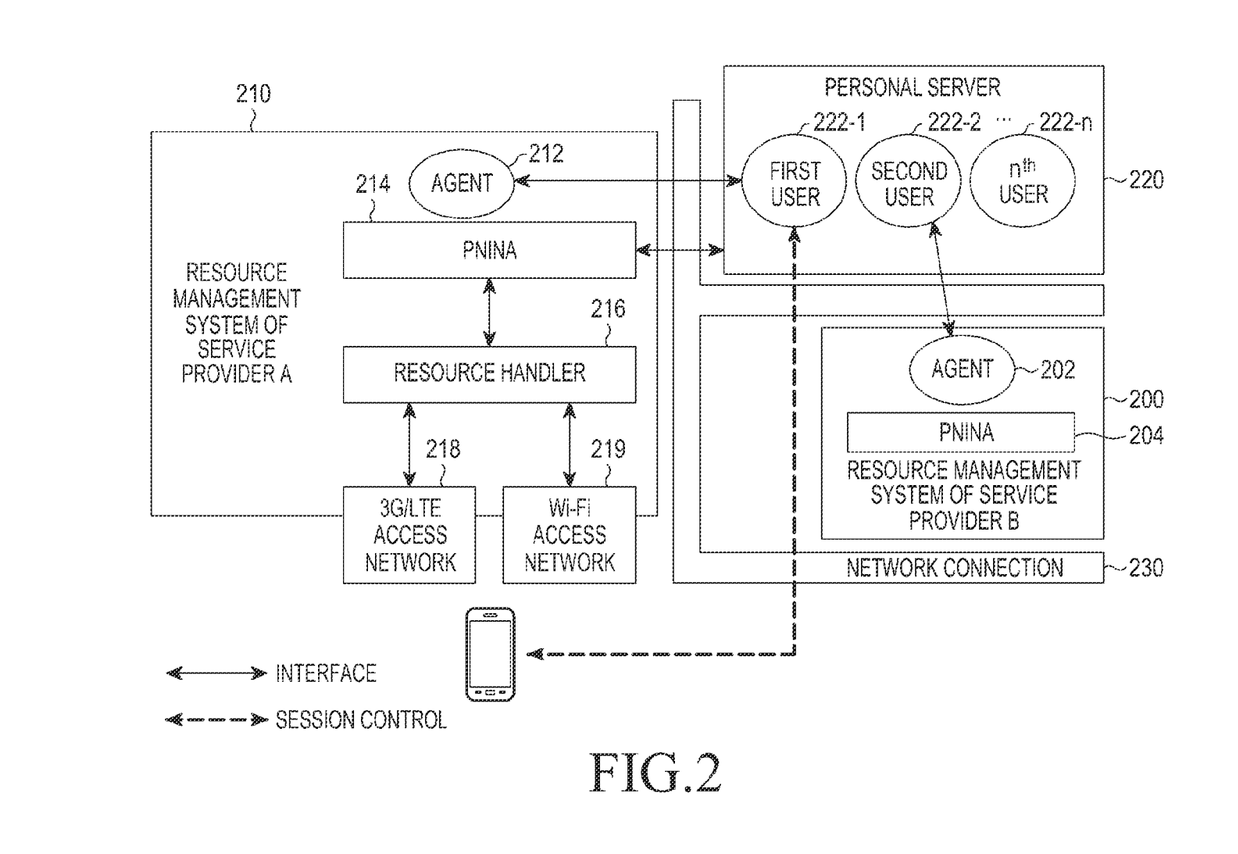
FIG. 2 is a diagram illustrating a structure of a mobile communication system supporting a personal pervasive network architecture, according to an embodiment of the present invention.

FIG. 2 is a diagram illustrating a structure of a mobile communication system supporting a personal pervasive network architecture, according to an embodiment of the present invention.

In general, a pervasive environment refers to an environment that provides shared resources of a user as well as a right of the user to automatically receive a desired service anytime and anywhere.

Embodiments of the present invention provide a structure of personal networking supporting a common execution environment of user agents as a representative of user devices.

The structure illustrated in FIG. 2 is referred to as a "Personal Networking Inhaled Network Architecture (PNINA)".

Referring to FIG. 2, the mobile communication system includes a resource management system of service provider A 210, a resource management system of service provider B 200, a personal server 220, a mobile station, and a network connection 230.

The resource management system of service provider A 210 and the resource management system of service provider B 200 refer to management systems operated by companies providing a mobile communication service.

The resource management system of service provider A 210 and the resource management system of service provider B 200 include PNINA sub systems 214 and 204 and user agents 212 and 202 in common, respectively. Hereinafter, the PNINA sub systems 204 and 214 will be described to have the same meaning as that of a sub module.

When a handover is made from the resource management system of service provider B 200 to the resource management system of service provider A 210, a receiver of the resource management system of service provider A 210 receives a request for a movement of the user agent from a personal server based on a current position of the mobile station and required QoS.

When QoS negotiation between the moved user agent and a resource manager is made by the required QoS and the QoS negotiation is succeeded, a resource handler of the resource management system of service provider A selects an access network which the mobile station will access.

A sub module of the resource management system of service provider A makes a user information update request for updating a result of the QoS negotiation by the required QoS and information on the selected access network.

The user agents 212 and 202 may move from the resource management system of service provider B 200 to the resource management system of service provider A 210, or stay at the resource management system of service provider A 210 and the resource management system of service provider B 200, respectively.

The user agents 202 and 212 may dynamically negotiate with wireless access networks for a best or most alternative configuration of resource allocation. Through such a structure, service providers may adopt users' demand for achieving optimal load distribution of the networks. Further, in a case of the mobile station, the user agent may manage other resources through the aid of the resource management systems of service providers. Accordingly, the structure helps the users in finding proper access networks according to whether their own mobile stations are currently used, and also helps the service providers in allocating their own heterogeneous wireless networks when managing loads according to other users' demand.

The personal server 220 may manage personal profiles of user agents and users for personal pervasive networking, and provide particular QoS profiles or information used for processing the QoS within wireless access networks. The personal server 220 may manage user profiles of a plurality of users 222-1, 222-2, 222-n, as well as a user profile of one user in an embodiment of the present invention. Accordingly, the personal server 220 may share price information and/or QoS of a plurality of users as well as one user.

A storage unit of the personal server 220, according to an embodiment of the present invention, registers a current position of the mobile station and a required QoS in response to a request of the mobile station.

When a handover is made from the resource management system of service provider B 200 to the resource management system of service provider A 210, a controller of the personal server 220, according to an embodiment of the present invention, makes a request for a movement of the user agent to the resource management system of service provider A 210, based on the current position of the mobile station and the required QoS.

When the movement of the user agent is completed, a receiver of the personal server 220, according to an embodiment of the present invention, receives a user information update request for updating a result of the QoS negotiation by the required QoS, and information on the selected access network from the resource management system of service provider A 200.

The PNINA sub system 214 receives a request for the movement of the user agent from the personal server 220 before the QoS negotiation. After the movement of the user agent (for example, the user agent 202 moves from the resource management system of service provider B 200 to the resource management system of service provider A 210), the user agent 212 performs the QoS negotiation with a resource handler 216. When the QoS negotiation is succeeded, the resource handler 216 selects an access network 218, 219 according to a result of the negotiation. Then, the mobile station accesses the selected access network and informs the personal server 220 of the success of the QoS negotiation.

The resource handler 216 provides price information to the personal server 220 according to the QoS and provides and/or selects an interface that can be used for the QoS negotiation.

Figure 3:
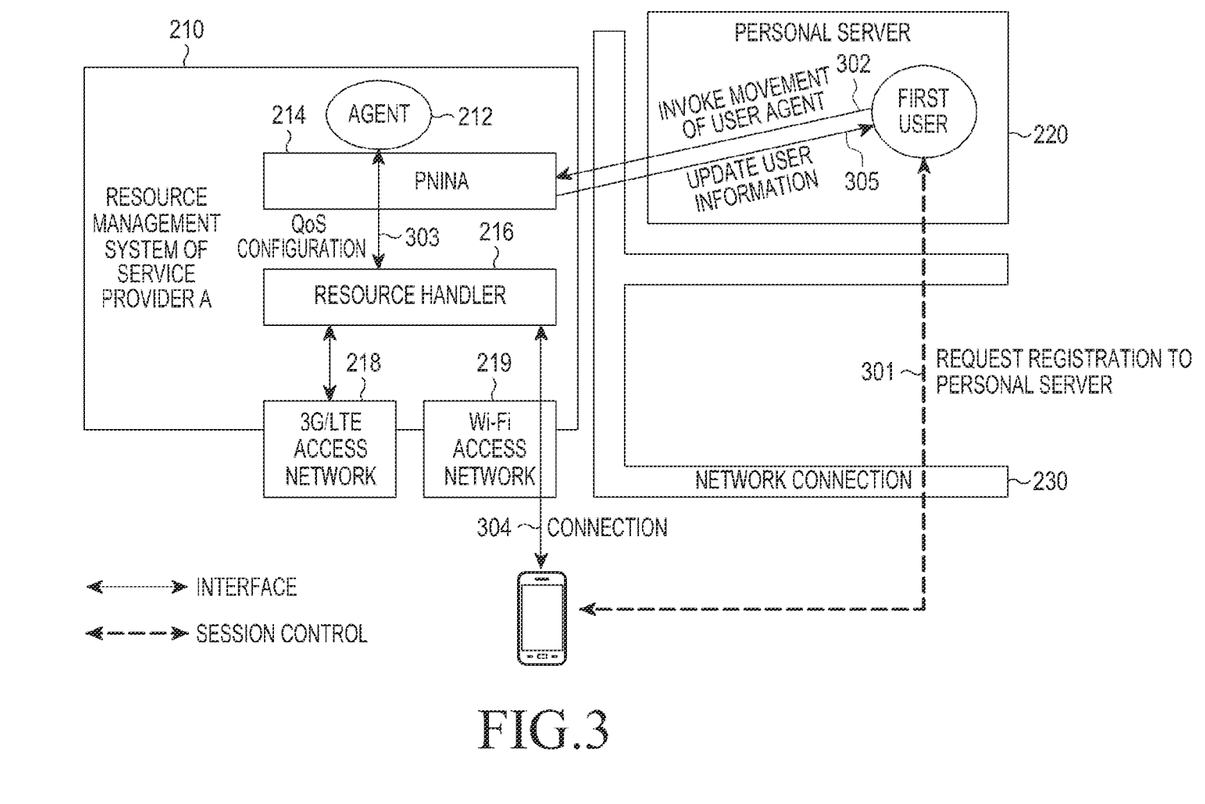
FIG. 3 is a diagram illustrating a structure of a mobile communication system supporting a personal pervasive network architecture, according to an embodiment of the present invention.

FIG. 3 is a diagram illustrating a structure of the mobile communication system supporting a personal pervasive network architecture, according to an embodiment of the present invention.

Referring to FIG. 3, two main system components exist. One main system corresponds to the resource management system of the service provider A 210 supporting load distribution and management between heterogeneous wireless access networks. The other main system corresponds to the personal server (PNINA server) 220 managing personal profiles of user agents and users for personal pervasive networking.

In embodiments of the present invention, it is assumed that the service providers include a QoS plan system or a resource management system that manages load distribution according to QoS requested by the mobile station. Such systems are defined as the resource management system of service provider A 210 and the resource management system of service provider B 200 in FIG. 2.

Embodiments of the present invention provide a structure supported by all types of common execution environments, such as, for example a virtual machine, middleware, and cloud computing environments, within the systems. Further, the resource handler 216 of the resource management system of service provider A 210 provides and/or selects an interface, which can be used for QoS negotiation. In the execution environment, the user agent 212 refers to a user to be served in one of the wireless access networks provided by the service operator. Since the users can have a mobile station that can support a plurality of different services, the user agent is also required to maintain the user profile per mobile station. The user agent 212 negotiates with the resource handler 216 about the access networks to be accessed and the negotiated QoS to be provided in the selected access network.

An operation of initiating the pervasive networking of the mobile station will be described with reference to FIG. 3.

In step 301, a PNINA client executed in the mobile station makes a request for a current position of the mobile station and QoS required by the mobile station for a new service to the personal server 220 through conventional global networks. The mobile stations may use charged access networks or other free access networks to access the resource management system of service provider A 210. The personal server 220 accesses the PNINA sub system 214 of the resource management system of service provider A 210 to negotiate about which wireless access networks can be provided to support the requested QoS, in step 302. The personal server 220 makes a request for a movement of the user agent to the PNINA sub system 214 and price information is also included in the request. In an embodiment of the present invention, the personal server 220 may stop accessing the resource management system of service provider B 200 and make a request for the movement of the user agent to the PNINA sub system 214 of the resource management system of service provider A 210. In another embodiment of the present invention, when a handover is made from the resource management system of service provider B 200 to the resource management system of service provider A 210, the personal server 220 may make a request for the movement of the user agent to the PNINA sub system 214 of the resource management system of service provider A 210.

Before the negotiation, the personal server 220 invokes the movement of the user agent to a PNINA stack executed in an upper part of the resource management system of service provider A 210 or the PNINA sub system 214. Thereafter, the PNINA sub system 214 negotiates with the resource handler 216 about the QoS and inquires about price information, in step 303. In the QoS negotiation, the access networks to be accessed and the negotiated QoS to be provided in the selected access network are negotiated. When the QoS negotiation between the user agent 212 and the resource manager is succeeded, the mobile stations access the selected access network and the PNINA sub system 214 informs the personal server 220 of the success of the QoS negotiation through the user agent 212, and the personal server 220 updates user information, in step 305. Through the above-described process, the mobile stations can access wireless networks to which the mobile stations have not actually registered.

Figure 4:
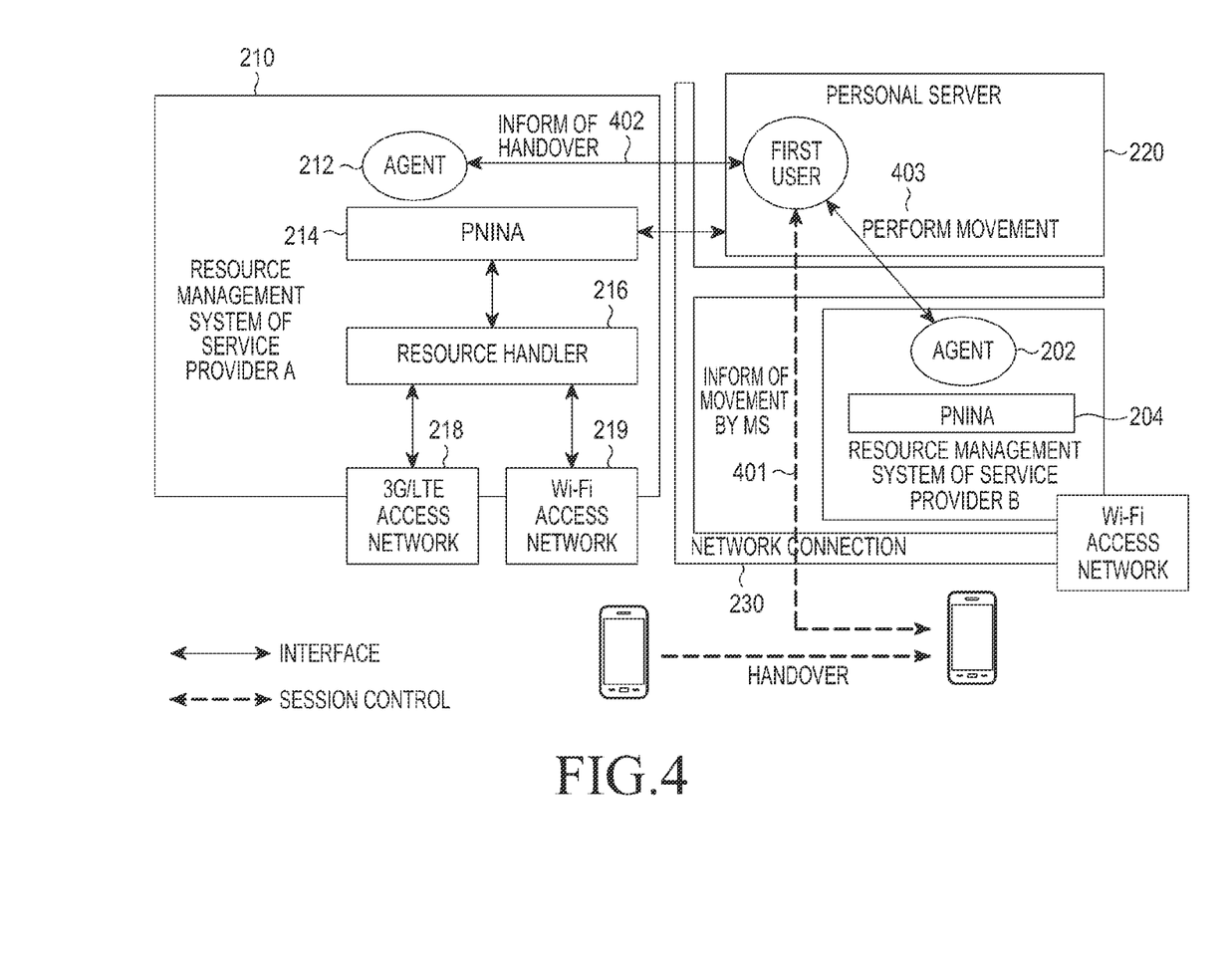
FIG. 4 is a diagram illustrating a structure of the mobile communication system supporting the personal pervasive network architecture, according to another embodiment of the present invention.

FIG. 4 is a diagram illustrating a structure of the mobile communication system supporting the personal pervasive network architecture, according to another embodiment of the present invention.

Hereinafter a resource management system of service operator A has the same meaning as that of the resource management system of service provider A, and a resource management system of service operator B has the same meaning as that of the resource management system of service provider B.

FIG. 4 illustrates a structure of the mobile communication system supporting the personal pervasive network architecture when the mobile station is handed over. When the mobile station is handed over, the user agent 212 may move its own position while detecting a movement of the mobile station. To this end, the mobile station informs the personal server 220 of its own movement, in step 401. When the personal server 220 searches for a QoS user profile corresponding to the mobile station and authentication succeeds, the personal server 220 informs the user agent 212 of the resource management system of service operator A 210 of the handover of the mobile station. There are two methods for detecting requirements of the movement. In a first method, the mobile station itself explicitly informs of its own movement through a session control interface, as described above. In a second method, the user agent 212 is informed of the handover or position update from a previous wireless network and transmits such information to the personal server 220, in step 402. After the movement is detected, the personal server 220 performs an operation of invoking the user agent 202 in wireless networks of a new resource management system of service provider B.

QoS information should be the same as application QoS, such as end-to-end QoS. However, according to the type of wireless access networks supported in the networks of the service operator, the personal server may provide particular QoS profiles or information used for QoS handling within the wireless access networks.

Since the user agent may move according to the movement of the mobile station or detect the movement in advance, the user agent can negotiate in advance with the next wireless access network, which becomes a new serving wireless access network. Further, some user data, such as documents that are secure from privacy invasion or security problems, and all types of files may be reflected in the new serving wireless access network. Through such an access, cloud computing may be localized by more quickly acquiring required services. The localization may assist in a quicker transfer of user data as well as a decrease in network traffic toward global networks.

Figure 5:
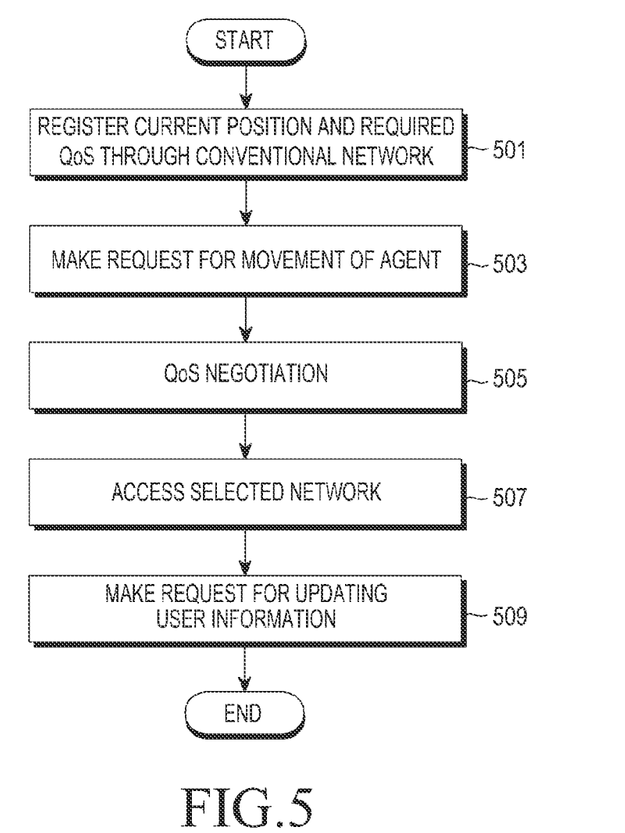
FIG. 5 is a flowchart illustrating a method of supporting a personal pervasive network architecture, according to an embodiment of the present invention.

FIG. 5 is a flowchart illustrating a method of supporting the personal pervasive network architecture, according to an embodiment of the present invention.

It is assumed that the current terminal receives a service from the resource management system of service provider A.

The mobile station registers a current position of the mobile station and requested QoS in the personal server through the conventional network, in step 501. In order to support the QoS requested by the mobile station and negotiate about the wireless access networks that can be provided, the personal server accesses a PNINA stack of the resource management system of service provider B or an agent at an upper part of the PNINA sub system. The personal server makes a request for a movement of the user agent through the PNINA stack of the resource management system of service provider B or the PNINA sub system, in step 503. Price information is also included in the request. When the request of the user agent is made, the conventionally accessed user agent of the resource management system of service provider A moves to the PNINA stack of the resource management system of service provider B or the upper part of the PNINA sub system.

The agent and the resource manager perform QoS negotiation, in step 505. Specifically, the network to be accessed is selected according to the requested QoS. In step 507, the mobile station accesses the selected access network. The PNINA sub system makes a request for a user information update to the personal server, in step 509, and the personal server reflects the user information update. The following algorithm is suggested to select the access network according to the requested QoS, and the price imposed for access to each wireless network.

The personal server searches for prices of all wireless access networks from service providers having the following QoS preference. The resource handler of the service operator should provide its own price according to suggested QoS having the following parameters. The QoS preference is provided by a PNINA client providing its own QoS preference. Alternatively, when the QoS preference is not specified by the PNINA, the QoS preference finally stored by the user agent is used.

Best QoS requirements of interest include high bandwidth/ low delay/jitter/(acceptable) loss.

Acceptable QoS requirements include reasonable bandwidth/acceptable delay/jitter/(acceptable) loss.

In a case of the best QoS requirements of interest, the user agent first groups some wireless networks imposing a higher QoS than that which the users can handle (referred to as a "first group"). Then, the remaining networks are grouped as a second group.

When the first group includes nothing, the next process is performed. Otherwise, the networks included in the first group are arranged in an ascending order of price and a first network is selected as the selected access network.

In a case of the acceptable QoS, free wireless access networks that may satisfy the acceptable QoS are searched for. When the search is succeeded, one free wireless access network is selected. Otherwise, some wireless networks imposing a higher QoS than that which the user can handle are grouped. Thereafter, the remaining networks are grouped as a second group.

When the first group includes nothing, the free wireless network is selected. Otherwise, the networks included in the first group are arranged in an ascending order of price and a first network is selected as the selected access network.

However, when a particular algorithm exists while user agents are moved or allocated to the PNINA sub system from the networks of the service providers, an algorithm of selecting serving access networks may become invalid. Further, all found price models are notified to the personal server. When a plurality of service providers are provided, the personal server may use the price models for guiding clients to select the service provider.

Embodiments of the present invention may be combined with cloud computing and allow service providers to be involved in allocating their own wireless access networks according to customers' demand. Accordingly, embodiments of the present invention can contribute to establishing a solution for relatively less dependent cloud computing in particular wireless technologies in spite of service operator oriented resource management.

Embodiments of the present invention provide a virtual computing environment in the PNINA through a virtual machine environment, and accordingly, support a PNINA structure that can be combined or coordinated with cloud computing. The virtual machine, according to an embodiment of the present invention, provides the same virtual machine environment in a PNINA platform with reference to an operating system supported by each terminal in various types designated to a profile of each user and the virtual machine environment.

Embodiments of the present invention may provide a cloud computing environment by providing various virtual computing environments to the PNINA sub system operated by the agent. The embodiments of the present invention may provide a virtual computing environment supporting an action of processing any type of information on the user through the virtual machine environment in the PNINA sub system. Accordingly, an embodiment of the present invention provides a method of transmitting/receiving only a basic signal for computing in a virtual environment instead of a method of directly transmitting user traffic through an access network in the virtual environment, by reducing amounts of user data transmitted to the access network. Accordingly, an embodiment of the present invention may provide a cost reduction effect to both the user and the service operator.

Figure 6:
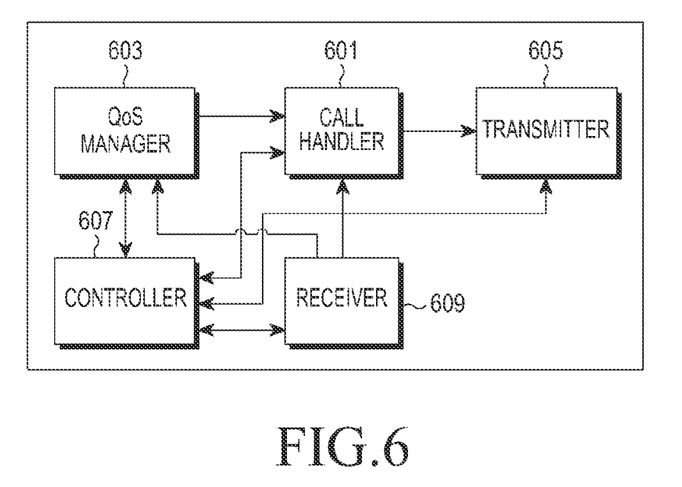
FIG. 6 is a block diagram of a mobile station supporting a personal pervasive network architecture, according to an embodiment of the present invention.

FIG. 6 is a block diagram illustrating the mobile station supporting the personal pervasive network architecture, according to an embodiment of the present invention.

A call handler 601 is in charge of call handling by a request of a user of the mobile station transmitted through a user interface.

A QoS manager 603 is located at an application layer of the mobile station and transmits a QoS registration message to a transmitter 605 through the call handler 601 in order to transfer the QoS requested by the mobile station to the personal server 220.

The transmitter 605 transmits the QoS registration request message received through the call handler 601 to the personal server 220. The QoS registration request message includes requested QoS information and current position information of the mobile station.

When QoS negotiation between the agent and the resource manager has succeeded, according to an embodiment of the present invention, the QoS manager 603 receives the success of the QoS negotiation through a receiver 609.

A controller 607 controls the call handler 601, the QoS manager 603, the transmitter 605, and the receiver 609 to perform the operations according to an embodiment of the present invention.

Although the mobile station has been described to include the call handler 601, the QoS manager 603, the transmitter 605, and the receiver 609, the present disclosure is not limited thereto.

Embodiments of the present invention, can contribute to establishing a solution for relatively less dependent cloud computing in particular wireless technologies in spite of service operator oriented resource management.

According to embodiments of the present invention, service operators can distribute loads over overlaid wireless networks.

According to embodiments of the present invention, user data can be efficiently transmitted.

According to embodiments of the present invention, an access network can be selected according to requested QoS.

The embodiments of present invention can provide a cost reduction effect to both a user and a service operator by providing a method of transmitting/receiving only a basic signal for computing in a virtual environment instead of a method of directly transmitting user traffic through an access network in the virtual environment.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method of supporting personal networking by a server in a mobile communication system, the method comprising the steps of:
    receiving a request from a mobile station;
    registering a current position of the mobile station and a required quality of service (QoS) in response to a request of the mobile station;
    when a handover is made from a resource management system of a service provider B to a resource management system of a service provider A, transmitting a request message for a movement of a user agent to the resource management system of the service provider A based on the current position of the mobile station and the required QoS; and
    when the movement of the user agent is completed, receiving a user information update request for updating a result of a QoS negotiation by the required QoS, and information on a selected access network, from the resource management system of the service provider A,
    wherein the user agent is moved from the resource management system of the service provider B to the resource management system of the service provider A,
    wherein the request message includes price information, and
    wherein the access network is selected based on the movement of the user agent, the result of QoS negotiation, and the price information.

2. The method of claim 1, wherein the movement of the user agent corresponds to a movement from a first user agent of the resource management system of the service provider B to a second user agent of the resource management system of the service provider A.

3. The method of claim 1, wherein the QoS negotiation comprises at least one of a negotiation about access networks to be accessed and a negotiation about QoS to be provided in the selected access network.

4. The method of claim 1, wherein the server searches for prices of all wireless access networks and stores at least one user profile.

5. A method of supporting personal networking by a resource management system of a service provider A, the method comprising the steps of:
    when a handover is made from a resource management system of a service provider B to the resource management system of the service provider A, receiving, from a server, a request message for a movement of a user agent based on a current position of a mobile station and a required quality of service (QoS);
    performing a QoS negotiation between the user agent and a resource manager by the required QoS;
    when the QoS negotiation has succeeded, selecting an access network that the mobile station will access; and
    transmitting a request message for updating user information to update a result of the QoS negotiation by the required QoS and information on the selected access network,
    wherein the user agent is moved from the resource management system of the service provider B to the resource management system of the service provider A,
    wherein the request messssage includes price information, and
    wherein the access network is selected based on the movement of the user agent, the result of QoS negotiation, and the price information.

6. The method of claim 5, wherein the movement of the user agent corresponds to a movement from a first user agent of the resource management system of the service provider B to a second user agent of the resource management system of the service provider A.

7. The method of claim 5, wherein the QoS negotiation comprises at least one of a negotiation about access networks to be accessed and a negotiation about QoS to be provided in the selected access network.

8. The method of claim 5, wherein the server searches for prices of all wireless access networks and stores at least one user profile.

9. An apparatus for supporting personal networking in a server in a mobile communication system, the apparatus comprising:
- a storage unit that registers a current position of a mobile station and a required QoS in response to a request of the mobile station;
- a controller that, when a handover is made from a resource management system of a service provider B to a resource management system of a service provider A, requests movement of a user agent to the resource management system of the service provider A based on the current position of the mobile station and the required QoS; and
- a receiver that receives a request from the mobile station and, when the movement of the user agent is completed, receives a user information update request for updating a result of a QoS negotiation by the required QoS, and information on a selected access network, from the resource management system of the service provider A,
- wherein the user agent is moved from the resource management system of the service provider B to the resource management system of the service provider A,
- wherein the request message includes price information, and
- wherein the access network is selected based on the movement of the user agent, the result of QoS negotiation, and the price information.

10. The apparatus of claim 9, wherein the movement of the user agent corresponds to a movement from a first user agent of the resource management system of the service provider B to a second user agent of the resource management system of the service provider A.

11. The apparatus of claim 9, wherein the QoS negotiation comprises at least one of a negotiation about access networks to be accessed and a negotiation about QoS to be provided in the selected access network.

12. The apparatus of claim 9, wherein the server searches for prices of all wireless access networks and stores at least one user profile.

13. An apparatus for supporting personal networking in a resource management system of a service provider A, the apparatus comprising:
- a receiver that, when a handover is made from a resource management system of a service provider B to the resource management system of the service provider A is made, receives a request for a movement of a user agent from a server based on a current position of a mobile station and a required Quality of Service (QoS);
- a resource handler that, when a QoS negotiation between the user agent and a resource manager is made by the required QoS and the QoS negotiation has succeeded, selects an access network that the mobile station will access; and
- a sub module that requests an update of user information to update a result of the QoS negotiation by the required QoS and information on the selected access network,
- wherein the user agent is moved from the resource management system of the service provider B to the resource management system of the service provider A,
- wherein the request message includes price information, and
- wherein the access network is selected based on the movement of the user agent, the result of QoS negotiation, and the price information.

14. The apparatus of claim 13, wherein the movement of the user agent corresponds to a movement from a first user agent of the resource management system of the service provider B to a second user agent of the resource management system of the service provider A.

15. The apparatus of claim 13, wherein the QoS negotiation comprises at least one of a negotiation about access networks to be accessed and a negotiation about QoS to be provided in the selected access network.

16. The apparatus of claim 13, wherein the server searches for prices of all wireless access networks and stores at least one user profile.

* * * * *